United States Patent
Gilomen et al.

(10) Patent No.: US 9,535,402 B2
(45) Date of Patent: Jan. 3, 2017

(54) TIMEPIECE CAPABLE OF INDICATING THE SUNRISE AND SUNSET AT EVERY POINT OF THE GLOBE

(71) Applicant: The Swatch Group Research and Development Ltd., Marin (CH)

(72) Inventors: Beat Gilomen, Grenchen (CH); Michel Willemin, Preles (CH); Dominique Lechot, Reconvilier (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 14/794,982

(22) Filed: Jul. 9, 2015

(65) Prior Publication Data

US 2016/0026153 A1    Jan. 28, 2016

(30) Foreign Application Priority Data

Jul. 23, 2014  (EP) .................................... 14178227

(51) Int. Cl.
*G04B 19/26*    (2006.01)
*G04B 49/00*    (2006.01)
(Continued)

(52) U.S. Cl.
CPC ............. *G04B 19/262* (2013.01); *G04B 19/22* (2013.01); *G04B 19/226* (2013.01); *G04B 19/26* (2013.01); *G09B 27/08* (2013.01)

(58) Field of Classification Search
CPC ..... G04B 19/22; G04B 19/262; G04B 19/226; G04B 19/26; G04B 49/00; G09B 27/08
(Continued)

(56) References Cited

U.S. PATENT DOCUMENTS 2,721,442 A * 10/1955 Pettigrew, Sr. ...... G04B 19/226
    116/300
3,370,415 A *  2/1968 McIlvaine ............... G04B 19/22
    368/24
(Continued)

FOREIGN PATENT DOCUMENTS

CH         705 722 A1    5/2013
DE       70 14 354 U    11/1970
(Continued)

OTHER PUBLICATIONS

Electronic English Translation of CH 705,722, translated May 5, 2016.*

(Continued)

*Primary Examiner* — Amy Cohen Johnson
*Assistant Examiner* — Daniel Wicklund
(74) *Attorney, Agent, or Firm* — Oblon, McClelland, Maier & Neustadt, L.L.P.

(57) ABSTRACT

A timepiece indicates the sunrise and sunset taking into account seasonal variations. The timepiece includes a sphere representing the Earth, a shell arranged concentrically to the sphere and arranged to delimit a part of the globe where it is night time from another part where it is daytime by indicating the position of the Earth's terminator. The shell can pivot around the globe along two perpendicular axes. The shell is driven by the movement in order to revolve at the rate of one revolution every 24 hours around the polar axis. A differential mechanism is controlled by a year cam that has a profile representing the inclination of the sun in relation to the equatorial plane. The differential mechanism controls the inclination of the shell around the axis by a drive shaft concentric to the polar axis.

9 Claims, 4 Drawing Sheets

(51) Int. Cl.
*G04B 19/22* (2006.01)
*G09B 27/08* (2006.01)

(58) Field of Classification Search
USPC .................................................. 368/15–18
See application file for complete search history.

(56) References Cited

U.S. PATENT DOCUMENTS

| | | | | |
|---|---|---|---|---|
| 4,308,604 | A * | 12/1981 | Graham | G04B 19/226 |
| | | | | 368/206 |
| 4,502,789 | A * | 3/1985 | Heath | G04B 19/223 |
| | | | | 368/21 |
| 5,280,458 | A * | 1/1994 | Scott | G04B 19/226 |
| | | | | 368/24 |
| 5,379,271 | A * | 1/1995 | Moedt | G09B 27/08 |
| | | | | 368/24 |
| 6,134,186 | A * | 10/2000 | Jang | G04B 19/223 |
| | | | | 368/27 |
| 6,834,025 | B1 | 12/2004 | Loaiza | |
| 6,947,351 | B1 * | 9/2005 | Loth | G01C 17/34 |
| | | | | 368/20 |
| 7,518,956 | B1 * | 4/2009 | Hansel | G04B 19/262 |
| | | | | 368/15 |
| 9,207,642 | B2 * | 12/2015 | Willemin | G04B 19/262 |
| 2002/0131329 | A1 | 9/2002 | Ochoa Loaiza | |
| 2005/0018542 | A1 * | 1/2005 | Dias | G04B 19/2536 |
| | | | | 368/35 |
| 2005/0105397 | A1 * | 5/2005 | Tuason | G04B 19/223 |
| | | | | 368/21 |
| 2005/0122842 | A1 * | 6/2005 | Barton | G04B 19/262 |
| | | | | 368/17 |
| 2011/0205852 | A1 * | 8/2011 | Zaugg | G04B 19/223 |
| | | | | 368/22 |
| 2014/0126336 | A1 * | 5/2014 | Goeller | G04B 19/268 |
| | | | | 368/15 |

FOREIGN PATENT DOCUMENTS

| | | | | |
|---|---|---|---|---|
| KR | WO 2006112641 | A1 * | 10/2006 | ........... G04G 9/0076 |
| WO | WO 02/082191 | A1 | 10/2002 | |

OTHER PUBLICATIONS

European Search Report issued Jun. 11, 2015 in European Application 14178227.6, filed on Jul. 23, 2014 (with English Translation).

* cited by examiner

TIMEPIECE CAPABLE OF INDICATING THE SUNRISE AND SUNSET AT EVERY POINT OF THE GLOBE

This application claims priority from European Patent Application No. 14178227.6 filed on Jul. 19, 2014, the entire disclosure of which is hereby incorporated herein by reference.

FIELD OF THE INVENTION

The present invention relates to a timepiece comprising a clock movement and means for indicating the sunrise and sunset taking into account seasonal variations, said means comprising a sphere representing the Earth, a support and a circle mounted on the support and arranged concentrically to the sphere, wherein the circle is arranged to indicate the position of the Earth's terminator, the circle and the sphere are arranged to be able to pivot in relation to one another around two perpendicular axes, the first of the two axes corresponding to the polar axis of the Earth and the second axis crossing the first axis at the centre of the sphere, wherein the circle is free to pivot in relation to the support around the second axis, and the means for indicating the sunrise and sunset also comprise a year cam having a profile representing the inclination of the sun in relation to the equatorial plane and arranged to be driven in rotation by the movement at the rate of one revolution per year, a cam follower arranged to cooperate with the cam and a kinematic link arranged to connect the cam follower to the circle so that with the first axis the plane subtended by the circle forms an angle equal to the angle of inclination of the sun in relation to the equatorial plane.

PRIOR ART

The length of a day is the time each day from the moment the upper limb of the sun appears above the horizon in the east at sunrise to its disappearance below the horizon in the west at sunset. Whatever the time, there is always one half of the surface of the globe that is lit by the sun and another half that is in darkness. The demarcation line between the part of the Earth that is lit and that which is in darkness is called the Earth's terminator. Geometrically speaking, the Earth's terminator is a large circle that encircles the globe. This large circle extends in a plane perpendicular to the plane of the Earth's orbit around the sun (called the ecliptic plane). It can also be noted that the centre of the Earth is located on the intersection line between these two planes.

In general, day length varies throughout the year and depends on the latitude. This variation is caused by the tilt of the Earth's rotational axis in relation to the ecliptic plane. By definition, this tilt corresponds to the latitude of the tropics which is ±23°27'. As is well known, the day length is shortest during the December solstice in the northern hemisphere and the June solstice in the southern hemisphere. During the equinoxes the length of a day is equal to that of night over the entire Earth.

Figure 3A:
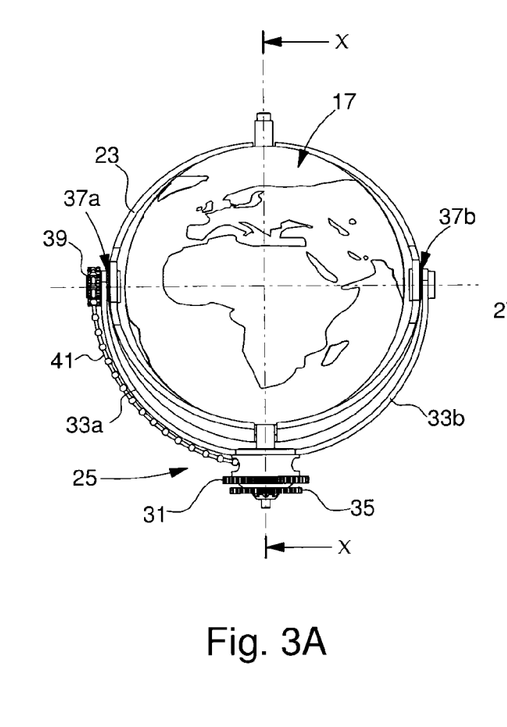
FIGS. 3A, 3B and 3C are partial views of a particular embodiment of the means for indicating the sunrise and sunset of the invention. The three partial views show the sphere that represents the Earth, the support and a shell, which is mounted to pivot on the support and is arranged concentrically to the sphere. The support is shown front facing in FIG. 3A, in profile in FIG. 3B and in three-quarter view in FIG. 3C.
Figure 3B:
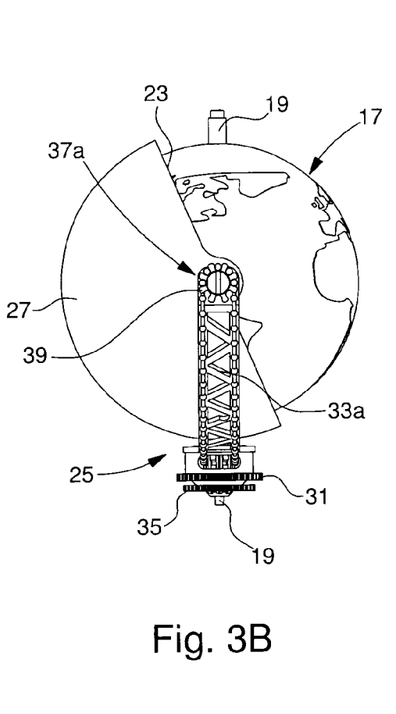

Timepieces corresponding to the definition given in the above preamble are already known. FIG. 3 of the German Utility Model DE 7014354 (U) in particular describes a table clock having a sphere that represents the globe and is mounted on a vertical axis to revolve above a support in the form of a case. The upper face of the support has an annular dial arranged concentrically to the axis of the sphere and representing a 24 hour circle. A clock movement housed in the support is provided to cause the globe to turn above the dial at the rate of one revolution every 24 hours. This known table clock also has a hemispherical shell slightly larger than the globe and mounted concentrically to the latter in order to surround it and only allow a half of it to be seen. The hemispherical shell is provided to enable one half-sphere lit by the sun to be distinguished from another that is in darkness. The hemispherical shell is additionally articulated on two vertical columns on either side of the Earth. It can thus pivot around a horizontal axis that crosses the vertical axis carrying the globe in the centre thereof. The shell is also fitted with a rack arranged to cooperate with a pinion forming part of a mechanism provided to control the angle of inclination of the shell so that the entire range between values − and +23.5° is passed through at this angle once a year in one direction and then the other to reproduce the effect of the variation in the inclination of the sun above the equator in accordance with the seasons.

It will be understood that the table clock described in the abovementioned prior art document reproduces the sequence of days and nights on Earth according to a viewpoint that could be termed Copernican. In fact, with this prior construction it is the Earth that turns on its own axis, while the sun's shadow only changes in inclination in accordance with the seasons. Although it is perhaps less correct from a scientific viewpoint, the geocentric representation with us at the centre while the sun revolves around us is much more consistent with our intuition.

BRIEF SUMMARY OF THE INVENTION

The aim of the present invention is to provide a timepiece that allows the sequence of days and nights on Earth to be reproduced in accordance with a geocentric viewpoint.

It will be understood that according to the invention the circle representing the Earth's terminator revolves with its support around the polar axis of the globe at the rate of one revolution every 24 hours. Moreover, the circle is mounted to pivot on the revolving support so that it can also change inclination in relation to the polar axis. The angle of inclination of the circle is controlled by a drive shaft arranged concentrically to the revolving support. The drive shaft is actuated by the movement to revolve at the same rate as the support, but with some phase shift. It is the value of the phase shift that determines the inclination of the circle in relation to the polar axis.

It will be understood that in the present context the expression "circle" does not necessarily denote a wholly complete circle. It can equally relate to a circle that has at least one break. In fact, according to the invention the axis around which the circle is mounted to pivot cuts the polar axis of the globe perpendicularly. Now, according to an advantageous embodiment of the invention the globe is mounted on a shaft that extends concentrically to the polar axis. In these conditions it is necessary that the circle has at least one break to allow the shaft and the circle to intersect when the inclination of the circle in relation to the polar axis passes through zero. Moreover, according to a preferred variant of the latter embodiment the shaft that carries the sphere is a through-shaft pivoted by its two ends. As will be seen further below, the circle must then have two breaks arranged opposite one another on the same diameter perpendicular to the pivot axis of the circle.

According to the invention, a differential mechanism allows the phase shift between the drive shaft and the revolving support to be modified. The differential mechanism comprises a first and a second input as well as an output. The first input of the differential mechanism is arranged to be driven in rotation by the movement and the output of the mechanism is connected to the drive shaft. The second input of the differential mechanism is connected kinematically to the cam follower so that the variations in profile of the year cam are reflected by the corresponding variations in phase shift of the drive shaft.

According to a preferred embodiment of the invention the timepiece is a watch, which comprises a dial, wherein the polar axis X-X is oriented parallel to the plane of the dial. This feature is original. In fact, the known timepieces that have means for indicating the sunrise and sunset taking into account seasonal variations are generally table clocks. In these clocks the polar axis X-X is normally arranged vertically. Although this arrangement is satisfactory in a table clock, it is not really suitable for a timepiece such as a watch, in which the display is only visible from one side through the watch glass. In fact, the sphere that represents the globe must be sufficiently large so that it is easy to locate, at least approximately, every place on the planet. The narrow space between the dial and the glass dictates that the globe used has a small space requirement. The only solution that enables a globe of a certain dimension with the polar axis oriented vertically to nevertheless be used is to provide a well-shaped opening in the dial to receive the sphere. However, such an arrangement limits visibility, since the hemisphere placed at the bottom is then completely invisible for the wearer of the watch. This is the reason why when the timepiece is a watch comprising a dial, the polar axis X-X is preferably oriented parallel to the plane of the dial.

BRIEF DESCRIPTION OF THE DRAWINGS

Other features and advantages of the present invention will become evident upon reading the following description given solely by way of non-restrictive example with reference to the attached drawings.

FIG. 5 is a perspective view of a particular embodiment of the means for indicating the sunrise and sunset taking into account seasonal variations according to the invention. FIG. 5 shows in particular the kinematic link connecting the cam follower to the circle.

DETAILED DESCRIPTION OF EMBODIMENTS

Figure 1:
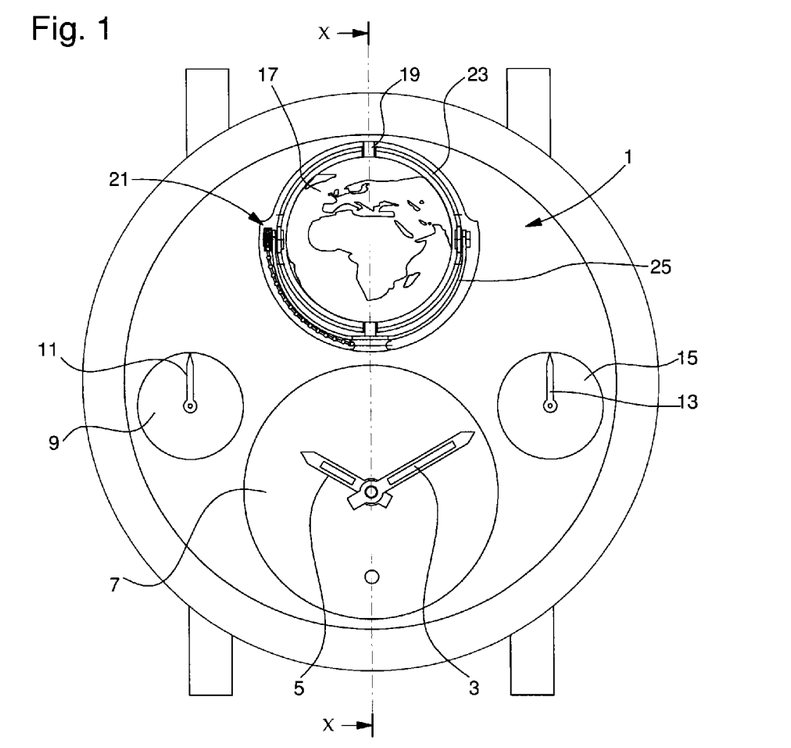
FIG. 1 is a plan view onto a wristwatch according to a particular embodiment of the invention.
Figure 2:
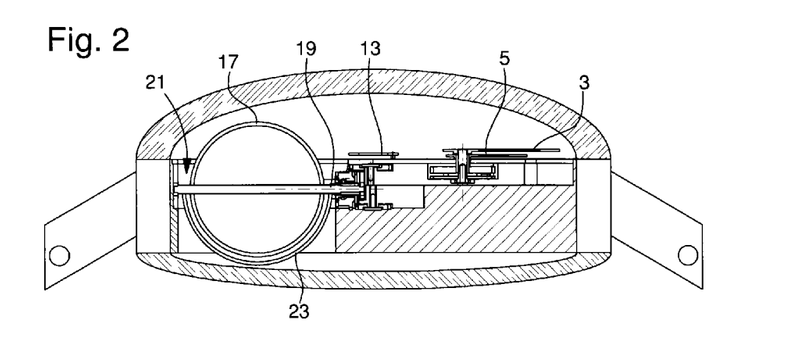
FIG. 2 is a schematic sectional view of the wristwatch of FIG. 1.

The watch illustrated in FIGS. 1 and 2 comprises in particular a main dial given the general reference 1. The main dial bears three small dials (references 7, 9 and 15) to give different information to the wearer of the watch. This firstly relates to time, which is indicated by two hands 3 and 5, the minute and hour hands respectively, arranged to turn in a conventional manner with respect to the first small dial 7. The illustrated watch also comprises a calendar, the display of which uses the other two small dials 9, 15. This calendar will not be described in detail, since it is not the subject of the invention. Suffice to say that the display of the days of the month (1 to 31) (or date) is assured by a small hand 13 arranged to turn above the small dial 15, and that another small hand 11 is arranged to provide an indication of the month of the year in cooperation with the third small dial 9.

According to the invention the shown watch also has means to indicate the sunrise and sunset in difference places on Earth while taking into account seasonal variations. On this basis, the watch of FIGS. 1 and 2 also has a sphere 17 that represents the Earth. It can be seen that the sphere 17 is mounted on a through-shaft 19 arranged concentrically to the polar axis X-X of the globe. In the illustrated embodiment the shaft 19 is oriented parallel to the plane of the dial and its two ends are engaged in two bearings (not given references) the frame carries to allow the sphere to turn around the polar axis X-X. It can also be seen that the sphere is housed in a well 21 arranged at 12 o'clock in the dial 1. Moreover, the polar axis X-X of the globe is superposed on the 12 o'clock-6 o'clock diameter of the watch. The north pole of the globe is oriented upwards (in the 12 o'clock direction) in a conventional manner.

According to the invention the means for indicating the sunrise and sunset in different places on Earth also comprise a circle 23 mounted on a support 25 and arranged concentrically to the sphere 17. It can be seen in the shown embodiment that the means for indicating the sunrise and sunset comprise, as a circle, a hemispherical shell 27 arranged concentrically to the sphere 17 in order to conceal half of the globe. It will be understood that according to this embodiment the hemispherical shell 27 has a substantially circular edge and that this edge forms the circle 23 according to the invention. It is therefore the position of the circular edge of the shell 27 that indicates the position of the Earth's terminator. An advantage associated with using a shell in the form of a half-sphere instead of a simple ring is that it is possible to clearly distinguish one part of the globe where it is night time from another where it is daytime. For example, the shell 27 can be made from a translucent or transparent material that is preferably lightly tinted to give the impression that the part of the globe covered by the shell is plunged into darkness. According to another variant (not shown) the shell could have the shape of a sphere formed by joining two half spheres with different tints, one depicting daytime and the other night time. The half-sphere depicting daytime would then preferably be more transparent than the other to allow the surface of the globe to be seen. It will be understood that according to this last variant the two half-spheres form a substantially circular strip between them and that this strip constitutes the circle according to the invention. Another advantage of the latter variant is that it provides the possibility of representing the sun in the middle of the half-sphere depicting the daytime. Hence, this variant allows a watch to be provided that indicates the moment at which the sun is at its zenith.

Figure 3C:
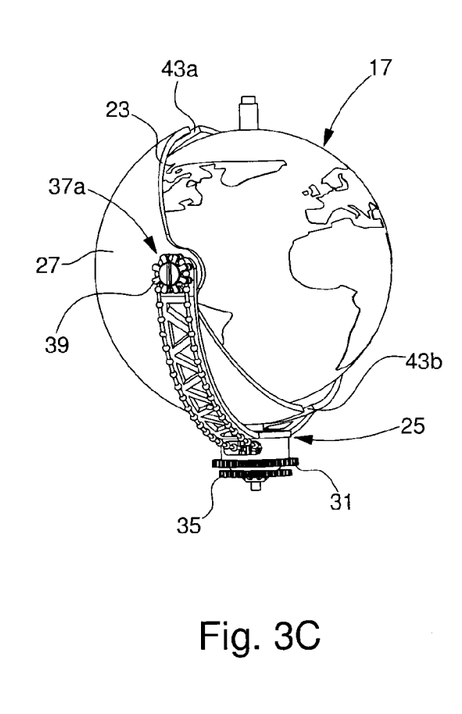
Figure 4:
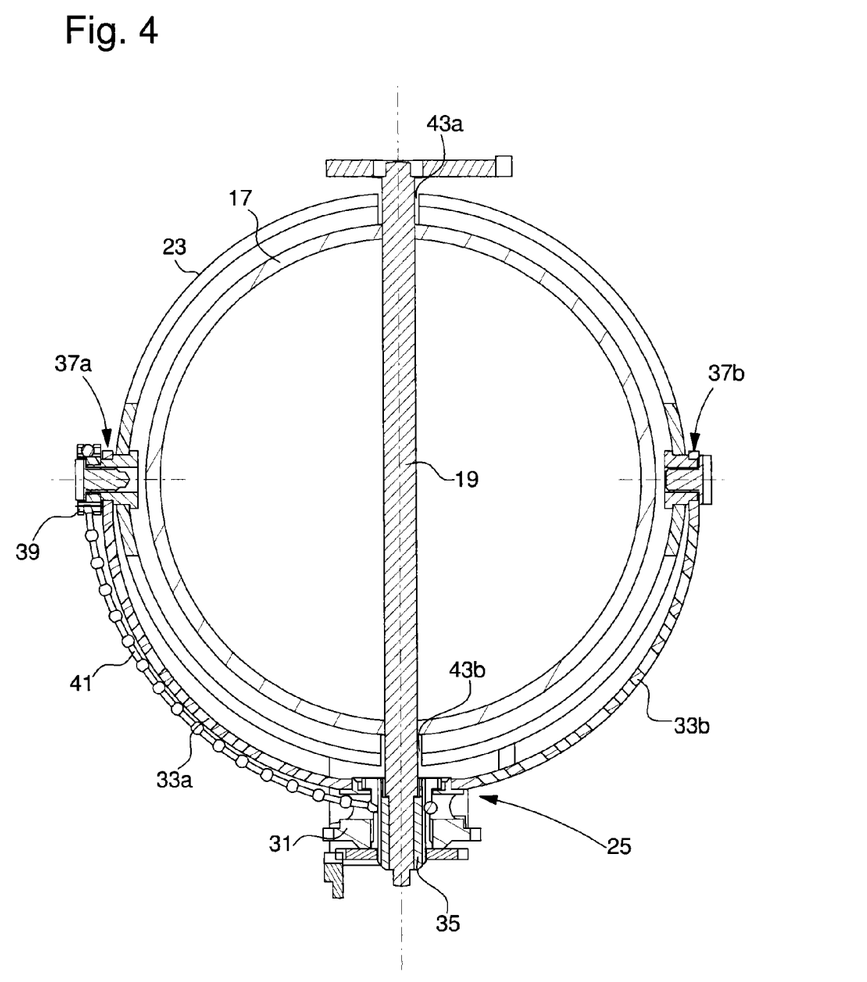
FIG. 4 is a view in partial cross-section of the means for indicating the sunrise and sunset of FIGS. 3A, 3B and 3C; the support being shown front facing as in FIG. 3A.

FIGS. 3A, 3B, 3C and 4 are more detailed views of the assembly formed by the sphere 17, the support 25 and the shell 27. The three views 3A, 3B and 3C show the shell and the support facing the front, in profile and in three-quarter view respectively. FIG. 4 illustrates the same assembly in cross-section and facing the front, as in FIG. 3A. Still referring to FIG. 3A, it can be seen that the support 25 has the general shape of a fork with a short trunk bearing two branches 33a and 33b, which extend symmetrically on either side of the sphere. In the shown variant the support 25 has an axis of symmetry that is merged with the polar axis X-X of the globe. Referring now to the enlarged sectional view of FIG. 4, it can be seen that the trunk of the support is formed by a first cannon pinion (reference 31), into the interior of which a second cannon pinion 35 passes as well as the shaft 19. In the illustrated embodiment the second cannon pinion is interposed between the shaft 19 and the first cannon pinion 31. It will be understood, however, that according to a variant it could be the first cannon pinion that was placed in the interior of the second cannon pinion. Moreover, it will be understood that in the two variants the two cannon pinions 31, 35 and the shaft 19 are free to revolve independently of one another.

It is also evident from the figures that the shell 27 is mounted to pivot between the two branches 33a, 33b by means of two joints given the reference 37a and 37b arranged coaxially in the extension of one another. Therefore, the shell can pivot on the support 25 around an axis of rotation that passes through the two joints. This pivot axis, which intersects the polar axis X-X at the centre of the sphere 17, will be referred to hereafter as the ecliptic axis and given the reference Y-Y. Each of the two joints 37a, 37b is formed by a pivot carried by the edge of the shell 27 and inserted into a bearing fixed to the end of one of the branches 33a, 33b. It will also be noted that the pivots that are inserted into the two bearings occupy diametrically opposed positions on the large circle 23 formed by the edge of the shell.

Referring once again to FIGS. 3A and 4, it can be seen that a chain 41 connects the second cannon pinion 35 to the joint 37A. More precisely, the chain 41 is drawn tight between a circular groove, which the cannon pinion 35 has and a pinion (reference 39) that the joint 37a has. The pinion 39 is fixed on the end of the pivot integral to the shell 27. It will be understood that in the illustrated embodiment the cannon pinion 35 forms the drive shaft according to the invention and that the circular groove, the chain 41 and the pinion 39 together form the transmission means arranged to connect the drive shaft to the circle 23. In accordance with the arrangement that has just been described, every rotation of the cannon pinion 35 in relation to the support 25 is transmitted to the pinion 39 by the chain 41. Thus, every rotation of the cannon pinion 35 in relation to the support 25 causes a corresponding pivoting movement of the shell 27 around the ecliptic axis Y-Y. It will be understood that as a result of the mechanism that has just been described it is possible to pass entirely through the range of values between + and −23.5° in one direction and then the other at the angle of inclination of the shell 27 in relation to the polar axis X-X. It will be understood that because of this construction the means for indicating the sunrise and sunset are able to take into account the effect of the variation in inclination of the sun above the equator in accordance with the seasons. With reference most particularly to FIGS. 3C and 4, it is evident that the edge 23 of the shell also has two slots 43a and 43b arranged in diametrically opposed positions halfway between the joints 37a and 37b. It will be understood that the function of the slots 43a and 43b is to allow the shaft 19 to pass through when the shell 27 is inclined in relation to the polar axis X-X.

It has been seen that according to the invention the support 25 is arranged to be driven by the movement in order to revolve around the first axis X-X at the rate of one revolution every 24 hours. Moreover, a drive shaft coaxial to the polar axis X-X is arranged to be driven in rotation by the movement by means of a differential mechanism at the same rate as the support 25, but with an angular displacement in relation to the support. It will be understood that in the illustrated embodiment the drive shaft is formed by the cannon pinion 35 and that the movement causes the support 25 to revolve by means of the tooth arrangement of the cannon pinion 31.

Figure 5:
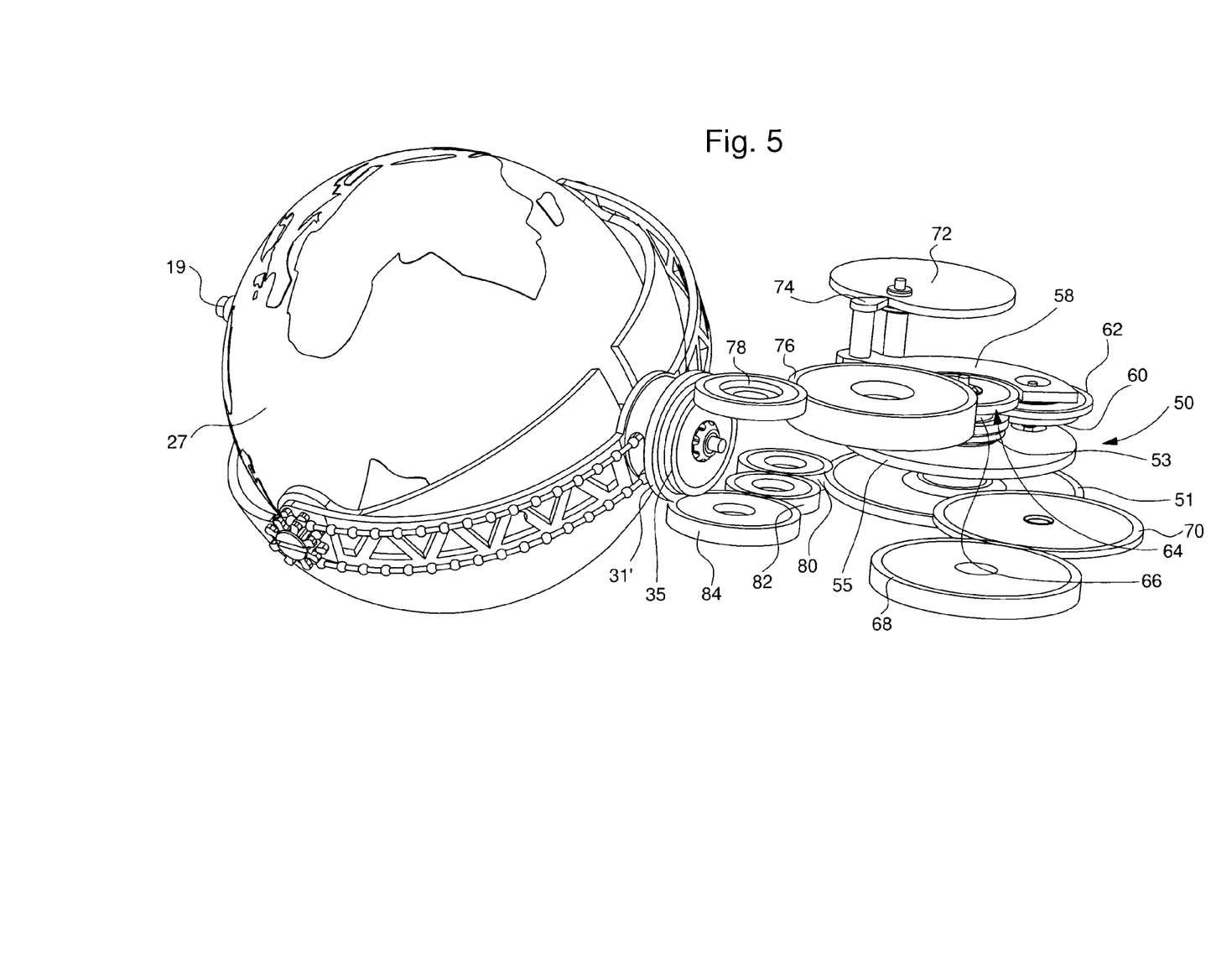

FIG. 5 is a perspective view of a particular embodiment of the means for indicating the sunrise and sunset according to the invention. FIG. 5 shows in particular a differential mechanism given the general reference 50. In the shown embodiment the differential 50 is formed by a planet wheel train, which comprises a first input motion work formed by a wheel 51 and a pinion 53, a second input motion work comprising a planet wheel carrier 55 integral to a bridge cam follower 58, a planet wheel work pivoted between the planet wheel carrier and the bridge cam follower and formed by a concentric pinion 60 and wheel 62, and finally an output motion work formed by a wheel 64 and a pinion 66.

FIG. 5 also shows the hour wheel of the movement (reference 68) and an intermediate motion work 70 connecting the hour wheel to the first input of the differential mechanism 50. It also shows a year cam 72 and a feeler spindle 74 carried by the bridge cam follower 58, which forms the second input of the differential mechanism. It is pointed out that the feeler spindle is pulled back against the cam 72 by a spring (not shown). In addition, two intermediate wheels 76 and 78 are interposed between the output of the differential and the cannon pinion 35.

The operation of the differential mechanism illustrated in FIG. 5 will now be explained. The hour wheel 68 is driven in a conventional way at a rate of one revolution every 12 hours. The hour wheel meshes with the intermediate motion work 70, which in turn drives the wheel 51 of the first input of the differential. In the illustrated embodiment the gear ratios are such that the wheel 51 makes one revolution in 24 hours.

It was also evident that the wheel 51 forms with the pinion 53 the input motion work of the differential 50. It will thus be understood that the pinion 53 also revolves at the rate of one revolution every 24 hours. The pinion 53 meshes with the pinion 60 of the planet wheel work. The planet wheel work is thus caused to revolve on its own axis. The wheel 62 of the planet wheel work in turn meshes with the pinion 66 of the output motion work of the differential (formed from the pinion 66 and the wheel 64) so that the output motion work is driven in rotation. In the illustrated embodiment the gear ratios are such that the output motion work revolves at the same rate as the motion work of the first input (formed by the wheel 51 and the pinion 53), provided that the second input is not actuated.

Referring once again to FIG. 5, it can be seen that three intermediate wheels 80, 82 and 84 connect the wheel 51 to the cannon pinion 31 of the support 25. It will thus be understood that the cannon pinion 31 and the support 25 are also driven by means of the hour wheel at a rate of one revolution every 24 hours. It is pointed out that the direction of the rotation of the support 25, and therefore also of the shell 27, is selected so as to reproduce the apparent movement of the sun revolving around the Earth. In these conditions the Earth's terminator shifts from the east to the west on the globe.

According to the invention the year cam 72 is arranged to be driven in rotation by the movement of the timepiece at a rate of one revolution per year and its profile represents the variation during the year in the tilt of the sun in relation to the equatorial plane of the Earth. It has also been seen that the bridge cam follower 58 is integral to the planet wheel carrier 55 and that it forms with the latter the second input of the differential 50. Moreover, the bridge cam follower bears a feeler spindle 74 arranged to cooperate with the year cam 72. It will thus be understood that the bridge cam follower and the planet wheel carrier 55 are arranged to pivot together concentrically to the differential in response to each variation in the profile of the year cam. When the planet wheel carrier pivots, the pinion 60 of the planet wheel work rolls on the tooth arrangement of the pinion 53 of the first input motion work of the differential. Thus, in a manner known per se, the pivoting movement of the planet wheel carrier 55 is transmitted to the pinion 70 of the output motion work by means of the wheel 62 of the planet wheel work. Therefore, every pivoting movement of the planet wheel carrier 55 has the effect of briefly modifying the rotation speed of the output motion work of the differential. The speed of the output motion work is thus modulated by the variations of the profile of the year cam 72.

It has been seen that in the illustrated embodiment the output motion work of the differential (formed by pinion 66 and wheel 64) revolve at the same rate as the first input motion work 51, 53 as long as the planet wheel carrier 55 remains motionless. It will thus be understood that the wheel 64 of the output motion work of the differential is driven by the movement at the rate of one revolution every 24 hours and that the phase shift between the wheel 64 and the first input motion work of the differential is determined by the angular position of the bridge cam follower 58. As FIG. 5 again shows, the output wheel 64 of the differential is arranged to drive the cannon pinion 35 by means of intermediate wheels 76 and 78, while the wheel 51 of the first input motion work of the differential is arranged to drive the cannon pinion 31 of the support 25 by means of the three intermediate wheels 80, 82 and 84. It will thus be understood that the phase shift between the cannon pinion 35 and the support 25 is determined by the profile of the year cam 72. As can also be seen in FIG. 5, the intermediate wheel 84 and the first cannon pinion 31 are perpendicular to one another and the intermediate wheel 78 and the second cannon pinion 35 are also perpendicular to one another. Conical gear trains can thus be provided to allow these wheels to cooperate.

It has been seen that the cannon pinion 35 is arranged to control the inclination of the shell 27 by means of a chain 41, which connects the cannon pinion 35 to a pinion 39 integral to one of the two pivots, by means of which the shell is held. As long as the cannon pinion 35 revolves at the same rate as the support 25, its rotational speed in relation to the support is zero. Since the chain 41 is carried by the support, it will be understood that it is not actuated as long as the cannon pinion 35 is motionless in relation to the support. On the contrary, every time the year cam 72 causes the planet wheel carrier 55 to pivot, this pivoting movement causes the cannon pinion 35 to rotate in relation to the support 25. This rotation is transmitted to the chain 41 and the pinion 39 so that the year cam causes the shell 27 to pivot in relation to the polar axis X-X.

It has been seen above that in the embodiment illustrated by FIGS. 1 and 2 the sphere 17 representing the globe is housed in a well 21 arranged in the dial in such a way that only one half of the globe is visible at a given moment. It has also been seen that the sphere 17 is mounted on a central shaft 19, which is arranged coaxially with the polar axis X-X. Moreover, the shaft is oriented parallel to the dial 1 and its two ends are engaged in bearings such that the globe can revolve on its own axis in order to change the visible portion from the dial side.

To be able to indicate the sunrise and sunset at every point of the globe, it is necessary that each point of the globe can be visible above the dial of the watch. It will be understood that for this it is necessary that the sphere representing the globe is able to revolve. It is therefore useful to provide that the watch comprises a manual control member that can be actuated by the wearer of the watch to cause the globe to revolve. Moreover, according to an advantageous variant the glass of the watch can show a short line superposed on the polar axis X-X. The presence of this line on the glass makes it easier to precisely adjust the orientation of the globe. Working from the information that has just been given, a person skilled in the art will have no difficulty in configuring a manual control mechanism that allows the orientation of the sphere 17 to be adjusted.

It will be understood that various modifications and/or improvements evident to the person skilled in the art can be made to the embodiment that forms the subject of the present description without departing from the framework of the present invention. In particular, the first input of the differential 50 does not need to be driven by the movement at the rate of one revolution in 24 hours. Moreover, the output of the differential 50 does not need to revolve at the same rate as the drive shaft 35. Reducing or step-up gears can be readily provided between the different elements of the kinematic link to adapt the rotation speeds.

What is claimed is:
1. A timepiece comprising:
a clock movement and means for indicating the sunrise and sunset taking into account seasonal variations, said means comprising a sphere representing the Earth, a support and a circle mounted on the support and arranged concentrically to the sphere, the circle being arranged to indicate the position of the Earth's terminator, the circle and the sphere being arranged to be able to pivot in relation to one another around two perpendicular axes, the first of the two axes, referred to as polar axis, corresponding to the polar axis of the Earth and the second axis, referred to as ecliptic axis, crossing the polar axis at the centre of the sphere, the circle being free to pivot in relation to the support around the ecliptic axis, wherein the means for indicating the sunrise and sunset taking into account seasonal variations comprises a shell arranged concentrically to the sphere that represents the globe, the shell being arranged to delimit a part of the globe where it is night time from another part where it is daytime, and wherein the shell has the general shape of a half-sphere and has a generally circular edge, the edge forming the circle arranged to indicate the position of the Earth's terminator, the means for indicating the sunrise and sunset also comprising a year cam having a profile representing the inclination of the sun in relation to the equatorial plane and arranged to be driven in rotation by the movement at a rate of one revolution per year, a cam follower arranged to cooperate with the cam and a kinematic link arranged to connect the cam follower to the circle so that with the polar axis the plane subtended by the circle forms an angle equal to the angle of inclination of the sun in relation to the equatorial plane, wherein
the support is arranged to be driven by the movement in order to revolve at the rate of one revolution every 24 hours around the polar axis driving the circle;
the means for indicating the sunrise and sunset comprise a differential mechanism and a drive shaft concentric to the polar axis and connected to the output of the differential mechanism so as to be driven in rotation by the movement by means of a first input of the differential mechanism at the same rate as the support but with an angular displacement in relation to the support;

the cam follower is connected to a second input of the differential mechanism such that the angular displacement of the drive shaft represents the inclination of the sun in relation to the equatorial plane, transmission means being also arranged between the drive shaft and the circle so that a change in angular displacement leads to a corresponding change to the value of the angle between the plane subtended by the circle and the polar axis, and wherein the ecliptic axis is substantially collinear with a diameter of the circle, and wherein the shell bears two pivots extending the two ends of the diameter, the two pivots being pivoted on a first and a second arm respectively of the support.

2. The timepiece comprising means for indicating the sunrise and sunset according to claim 1, further comprising a dial, the polar axis being oriented substantially parallel to the plane of the dial.

3. The timepiece comprising means for indicating the sunrise and sunset according to claim 1, wherein the timepiece is a watch.

4. The timepiece comprising means for indicating the sunrise and sunset according to claim 1, wherein the edge of the shell has two slots arranged in diametrically opposed positions halfway between the two pivots.

5. The timepiece comprising means for indicating the sunrise and sunset according to claim 1, further comprising a calendar mechanism arranged to indicate the days of the month and the month, and wherein the year cam is connected kinematically to the calendar mechanism.

6. The timepiece comprising means for indicating the sunrise and sunset according to claim 1, wherein the circle is connected kinematically to the drive shaft by a belt or a chain.

7. The timepiece comprising means for indicating the sunrise and sunset according to claim 1, wherein the kinematic link passes through the second input of the differential mechanism, which comprises a planet wheel carrier integral to the cam follower.

8. The timepiece comprising means for indicating the sunrise and sunset according to claim 1, wherein the first and second arms of the support are cut away in order to increase the portion of the surface of the globe that is visible at a given moment.

9. The timepiece comprising means for indicating the sunrise and sunset according to claim 1, wherein the first and second arms of the support are made from a transparent material in order to increase the portion of the surface of the globe that is visible at a given moment.

* * * * *